United States Patent
Liu et al.

(10) Patent No.: US 11,574,259 B2
(45) Date of Patent: Feb. 7, 2023

(54) PARKING LOT FREE PARKING SPACE PREDICTING METHOD, APPARATUS, ELECTRONIC DEVICE AND STORAGE MEDIUM

(71) Applicant: BEIJING BAIDU NETCOM SCIENCE AND TECHNOLOGY CO., LTD., Beijing (CN)

(72) Inventors: Hao Liu, Beijing (CN); Weijia Zhang, Beijing (CN); Hui Xiong, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 141 days.

(21) Appl. No.: 17/021,831

(22) Filed: Sep. 15, 2020

(65) Prior Publication Data
US 2021/0232986 A1 Jul. 29, 2021

(30) Foreign Application Priority Data
Jan. 23, 2020 (CN) .......................... 202010076242.4

(51) Int. Cl.
*G06Q 10/06* (2012.01)
*G06N 3/08* (2006.01)
(Continued)

(52) U.S. Cl.
CPC .............. *G06Q 10/06* (2013.01); *G06N 3/08* (2013.01); *G06K 9/6215* (2013.01); *G06Q 50/30* (2013.01)

(58) Field of Classification Search
CPC ...... G06Q 50/30; G06Q 10/06; G06N 3/0445; G06N 3/0454; G06N 3/0481; G06N 3/08; G06N 5/022; G06K 9/6215
See application file for complete search history.

(56) References Cited

U.S. PATENT DOCUMENTS 5,155,763 A * 10/1992 Bigus .................. H04M 3/5158
379/112.01
8,484,151 B1 * 7/2013 Lookingbill ........... G08G 1/147
706/46
(Continued)

FOREIGN PATENT DOCUMENTS

CN    108648492 A  * 10/2018    ........... G08G 1/0968
CN    109492817 A     3/2019
(Continued)

OTHER PUBLICATIONS

"A Reservation-based Smart Parking System", by Hongwei Wang, University of Nebraska-Lincoln, Department of Computer Science and Engineering, 2011. (Year: 2011).*
(Continued)

*Primary Examiner* — Pan G Choy
(74) *Attorney, Agent, or Firm* — Ladas & Parry, LLP

(57) ABSTRACT

A parking lot free parking space predicting method, apparatus, electronic device and storage medium are provided. The method comprises: building a parking lot association graph for parking lots in a region to be processed; as for any parking lot i, performing the following processing respectively: determining local space correlation information of the parking lot i at a current time according to environment context features of the parking lot i and neighboring parking lots which are in the parking lot association graph and connected to the parking lot i through edges; determining time correlation information of the parking lot i at the current time according to the local space correlation information, and predicting free parking space information of the parking lot i at at least one future time step according to the time correlation information of the parking lot i at the current time.

11 Claims, 3 Drawing Sheets

(51) Int. Cl.
*G06K 9/62* (2022.01)
*G06Q 50/30* (2012.01)

(56) References Cited

U.S. PATENT DOCUMENTS

| | | | | |
|---|---|---|---|---|
| 9,551,113 | B1* | 1/2017 | Polivka | E01C 9/086 |
| 2013/0262059 | A1* | 10/2013 | Grbovic | G06Q 10/04 |
| | | | | 706/12 |
| 2018/0313660 | A1 | 11/2018 | Eyster et al. | |
| 2019/0082509 | A1* | 3/2019 | Lv | G09G 3/22 |
| 2019/0172182 | A1* | 6/2019 | Onzon | G06T 5/002 |
| 2019/0294889 | A1* | 9/2019 | Sriram | G06V 10/82 |

FOREIGN PATENT DOCUMENTS

| | | |
|---|---|---|
| CN | 110189537 A | 8/2019 |
| CN | 110415546 A | 11/2019 |
| CN | 110555990 A | 12/2019 |
| CN | 110599236 A | 12/2019 |
| CN | 110619442 A | 12/2019 |
| CN | 110660219 A | 1/2020 |
| WO | WO-2006109828 A1 * 10/2006 | ............... G08G 1/14 |
| WO | WO-2019166559 A1 * 9/2019 | ......... G06K 9/00651 |

OTHER PUBLICATIONS

"What is the Relationship between the Neighborhood Built Environment and Time Spent in Outdoor Play? A Systematic Review", by Amalie Lambert et al., International Journal of Environmental Research and Public Health, Oct. 11, 2019. (Year: 2019).*

"Deep Learning for Land Cover and Land Use Classification", by Ce Zhang, Lancaster Environment Centre, Lancaster University, Aug. 2018. (Year: 2018).*

"Parking Availability Prediction based on Machine Learning Approaches: A Case Study in the Short North Area", by Yuxiao Zhao, Graduate Program in Computer Science and Engineering, The Ohio State University, 2020. (Year: 2020).*

First Office Action and search report from corresponding CN app. No. 202010076242.4, dated Jan. 7, 2022, with machine English translation provided by Google Translate, all pages.

* cited by examiner

PARKING LOT FREE PARKING SPACE PREDICTING METHOD, APPARATUS, ELECTRONIC DEVICE AND STORAGE MEDIUM

The present application claims the priority of Chinese Patent Application No. 202010076242.4, filed on Jan. 23, 2020, with the title of "Parking lot free parking space predicting method, apparatus, electronic device and storage medium". The disclosure of the above application is incorporated herein by reference in its entirety.

FIELD OF THE DISCLOSURE

The present disclosure relates to computer application technologies, and particularly to a parking lot free parking space predicting method, apparatus, electronic device and storage medium in the field of artificial intelligence.

BACKGROUND OF THE DISCLOSURE

When drivers need to park vehicles, they usually want to know which nearby parking lots can provide free parking spaces in near future, and correspondingly, if free parking space information of parking lots can be predicted, the drivers' parking efficiency can be improved effectively.

At present, annotation data may be generated based on a user's feedback, thereby predicting a degree of difficulty in parking vehicles in a certain region. However, the annotation data obtained in this manner might be inaccurate, for example, the user himself does not have precise metrics of the degree of parking difficulty and provides a coarse evaluation only by virtue of his own feeling. Furthermore, some misoperations of the user might occur and affect the feedback accuracy. The prediction results are very inaccurate on account of these problems.

SUMMARY OF THE DISCLOSURE

In view of the above, the present application provides a parking lot free parking space predicting method, apparatus, electronic device and storage medium.

A parking lot free parking space predicting method, comprising:

building a parking lot association graph for parking lots in a region to be processed, each junction therein representing a parking lot, and connecting any two parking lots meeting a predetermined condition through edges;

as for any parking lot i, performing the following processing respectively:

determining local space correlation information of the parking lot i at a current time according to environment context features of the parking lot i and neighboring parking lots which are in the parking lot association graph and connected to the parking lot i through edges;

determining time correlation information of the parking lot i at the current time according to the local space correlation information, and predicting free parking space information of the parking lot i at at least one future time step according to the time correlation information of the parking lot i at the current time.

According to a preferred embodiment of the present disclosure, the connecting any two parking lots meeting a predetermined condition through edges comprises: connecting any two parking lots with a distance less than or equal to a first predetermined threshold through edges.

According to a preferred embodiment of the present disclosure, the determining local space correlation information of parking lot i at a current time comprises: determining local space correlation information of parking lot i at a current time based on a graph attention neutral network model;

the determining time correlation information of the parking lot i at the current time, and the predicting free parking space information of the parking lot i at at least one future time step according to the time correlation information of the parking lot i at the current time comprises: determining time correlation information of the parking lot i at the current time based on a gated recurrent neural network model, and predicting the free parking space information of the parking lot i at at least one future time step according to the time correlation information of the parking lot i at the current time.

According to a preferred embodiment of the present disclosure, the determining local space correlation information of parking lot i at a current time based on a graph attention neutral network model comprises:

as for the parking lot i, executing the following predetermined processing:

as for neighboring parking lots, determining weights of edges between the neighboring parking lots and the parking lot i at the current time according to the environment context features of the neighboring parking lots and parking lot i at the current time, respectively;

aggregating the environment context features of the neighboring parking lots according to the weights of edges between the neighboring parking lots and the parking lot i to obtain a representation vector of the parking lot i;

incrementing execution times by one, the execution times being initially zero; if the execution times are equal to a second predetermined threshold, regarding the representation vector as the local space correlation information of the parking lot i at the current time, otherwise, regarding the representation vector as the environment context features of the parking lot i, and executing the predetermined processing repeatedly.

According to a preferred embodiment of the present disclosure, a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i$, $W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training.

According to a preferred embodiment of the present disclosure, the representation vector $x'_i = \sigma(\Sigma_{j \in N_i} \alpha_{ij} W_a x_j)$;

where $N_i$ represents a number of the neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

According to a preferred embodiment of the present disclosure, the determining time correlation information of the parking lot i at the current time based on a gated recurrent neural network model comprises:

determining the time correlation information of parking lot i at the current time according to the local space correlation information of the parking lot i at the current time and output of the gated recurrent neural network model at a previous time.

According to a preferred embodiment of the present disclosure, the time correlation information $h_i^t$ of the parking lot i at the current time is expressed as $$h_i^t = (1-z_i^t) \circ h_i^{t-1} + z_i^t \circ \tilde{h}_i^t;$$

where $z_i^t = \sigma(W_z[h_i^{t-1}, x_i'] + b_z);$ $\tilde{h}_i^t = \tan h(W_{\tilde{h}}[r_i^t \circ h_i^{t-1}, x_i'] + b_{\tilde{h}});$ $r_i^t = \sigma(W_r[h_i^{t-1}, x_i'] + b_r);$ where $W_z$, $W_{\tilde{h}}$, $W_r$, $b_z$, $b_{\tilde{h}}$ and $b_r$ all are model parameters obtained by pre-training; $\sigma$ represents an activation function; $x_i'$ represents local space correlation information of the parking lot i at the current time; $h_i^{t-1}$ represents the output of the gated recurrent neural network model at the previous time.

According to a preferred embodiment of the present disclosure, the predicting free parking space information of the parking lot i at at least one future time step according to the time correlation information of the parking lot i at the current time comprises:

predicting the free parking space information of the parking lot i at future r time steps in the following manner: $(\hat{y}_i^{t+1}, \ldots, \hat{y}_i^{t+\tau}) = \sigma(W_o h_i^t);$ where $\tau$ is a positive integer greater than one; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

According to a preferred embodiment of the present disclosure, the method further comprises:

when performing model training, selecting $N_l$ parking lots with real-time sensors as sample parking lots, building annotation data based on historical free parking space information of the sample parking lots, performing training optimization based on the annotation data, and minimizing an objective function O;

wherein the objective function $$O = \frac{1}{\tau N_l} \sum_{i=1}^{N_l} \sum_{j=1}^{\tau} (\hat{y}_i^{t+j} - y_i^{t+j})^2,$$

where $N_l$ is a positive integer greater than 1; $y_i^{t+j}$ represents real free parking space information of any sample parking lot i at a corresponding time step.

A parking lot free parking space predicting apparatus, comprising a building unit and a predicting unit;

the building unit is configured to build a parking lot association graph for parking lots in a region to be processed, each junction therein representing a parking lot, and connect any two parking lots meeting a predetermined condition through edges;

the predicting unit is configured to, as for any parking lot i, perform the following processing respectively: determining local space correlation information of the parking lot i at a current time according to environment context features of the parking lot i and neighboring parking lots which are in the parking lot association graph and connected to the parking lot i through edges; determine time correlation information of the parking lot i at the current time according to the local space correlation information, and predict free parking space information of the parking lot i at at least one future time step according to the time correlation information of the parking lot i at the current time.

According to a preferred embodiment of the present disclosure, the building unit connects any two parking lots with a distance less than or equal to a first predetermined threshold through edges.

According to a preferred embodiment of the present disclosure, the predicting unit determines local space correlation information of parking lot i at a current time based on a graph attention neutral network model;

the predicting unit determines time correlation information of the parking lot i at the current time based on a gated recurrent neural network model, and predicts the free parking space information of the parking lot i at at least one future time step according to the time correlation information of the parking lot i at the current time.

According to a preferred embodiment of the present disclosure, the predicting unit executes the following predetermined processing as for the parking lot i:

as for neighboring parking lots, determining weights of edges between the neighboring parking lots and the parking lot i at the current time according to the environment context features of the neighboring parking lots and parking lot i at the current time, respectively;

aggregating the environment context features of the neighboring parking lots according to the weights of edges between the neighboring parking lots and the parking lot i to obtain a representation vector of the parking lot i;

incrementing execution times by one, the execution times being initially zero; if the execution times are equal to a second predetermined threshold, regarding the representation vector as the local space correlation information of the parking lot i at the current time, otherwise, regarding the representation vector as the environment context features of the parking lot i, and executing the predetermined processing repeatedly.

According to a preferred embodiment of the present disclosure, a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i$, $W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training.

According to a preferred embodiment of the present disclosure, the representation vector $x_i' = \sigma(\Sigma_{j \in N_i} \alpha_{ij} W_a x_j);$ where $N_i$ represents a number of the neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

According to a preferred embodiment of the present disclosure, the predicting unit determines the time correlation information of parking lot i at the current time according to the local space correlation information of the parking lot i at the current time and output of the gated recurrent neural network model at a previous time.

According to a preferred embodiment of the present disclosure, the time correlation information $h_i^t$ of the parking lot i at the current time is expressed as $$h_i^t = (1-z_i^t) \circ h_i^{t-1} + z_i^t \circ \tilde{h}_i^t;$$

where $z_i^t = \sigma(W_z[h_i^{t-1}, x'_i] + b_z);$ $$\tilde{h}_i^t = \tan h(W_{\tilde{h}}[r_i^t \circ h_i^{t-1}, x'_i] + b_{\tilde{h}});$$

$$r_i^t = \sigma(W_r[h_i^{t-1}, x'_i] + b_r);$$

where $W_z$, $W_{\tilde{h}}$, $W_r$, $b_z$, $b_{\tilde{h}}$ and $b_r$ all are model parameters obtained by pre-training; $\sigma$ represents an activation function; $x'_i$ represents local space correlation information of the parking lot i at the current time; $h_i^{t-1}$ represents the output of the gated recurrent neural network model at the previous time.

According to a preferred embodiment of the present disclosure, the predicting unit predicts the free parking space information of the parking lot i at future $\tau$ time steps in the following manner: $(\hat{y}_i^{t+1}, \hat{y}_i^{t+\tau}) = \sigma(W_o h_i^t);$ where $\tau$ is a positive integer greater than one; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

According to a preferred embodiment of the present disclosure, the apparatus further comprises a pre-processing unit configured to perform model training, wherein $N_l$ parking lots with real-time sensors are selected as sample parking lots, annotation data are built based on historical free parking space information of the sample parking lots, training optimization is performed based on the annotation data, and an objective function O is minimized;

the objective function $$O = \frac{1}{\tau N_l} \sum_{i=1}^{N_l} \sum_{j=1}^{\tau} (\hat{y}_i^{t+j} - y_i^{t+j})^2,$$

where $N_l$ is a positive integer greater than 1; $y_i^{t+j}$ represents real free parking space information of any sample parking lot i at a corresponding time step.

An electronic device, comprising:
at least one processor; and
a memory communicatively connected with the at least one processor; wherein,
the memory stores instructions executable by the at least one processor, and the instructions are executed by the at least one processor to enable the at least one processor to perform the method stated above.

A non-transitory computer-readable storage medium storing computer instructions therein, wherein the computer instructions are used to cause the computer to perform the method stated above.

Embodiments of the present disclosure have the following advantages or advantageous effects: the local space correlation information and the time correlation information of the parking lot may be determined in conjunction with the environment context features of the parking lot, and future free parking space information of the parking lot may be predicted based on these information, thereby improving the accuracy of the prediction result; in addition, the local space correlation information and time correlation information of the parking lot may be obtained by virtue of different network models, thereby enhancing the accuracy of the obtained result and further enhancing the accuracy of subsequent prediction results; furthermore, when the model is trained, annotation data may be built using historical free parking space information of the parking lots with real-time sensors, and training optimization may be performed, thereby making the annotation data more accurate and improving the training effect of the model. Other effects of the above optional manners will be described hereunder in conjunction with specific embodiments.

BRIEF DESCRIPTION OF DRAWINGS

The figures are intended to facilitate understanding the solutions, not to limit the present disclosure. In the figures.

DETAILED DESCRIPTION OF PREFERRED EMBODIMENTS

Exemplary embodiments of the present disclosure are described below with reference to the accompanying drawings, include various details of the embodiments of the present disclosure to facilitate understanding, and should be considered as merely exemplary. Therefore, those having ordinary skill in the art should recognize that various changes and modifications can be made to the embodiments described herein without departing from the scope and spirit of the application. Also, for the sake of clarity and conciseness, depictions of well-known functions and structures are omitted in the following description.

In addition, it should be appreciated that the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
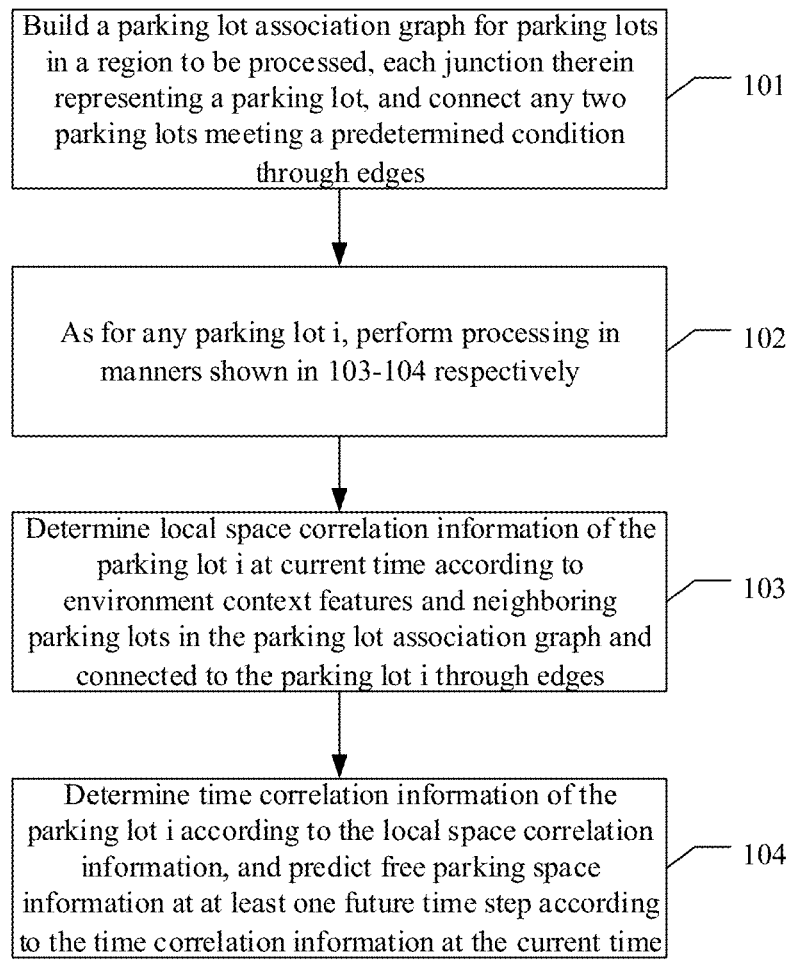
FIG. 1 illustrates a flow chart of an embodiment of a parking lot free parking space predicting method according to the present disclosure.

FIG. 1 illustrates a flow chart of an embodiment of a parking lot free parking space predicting method according to the present disclosure. As shown in FIG. 1, the embodiment comprises the following specific implementation mode.

At 101, a parking lot association graph is built for parking lots in a region to be processed, each junction therein representing a parking lot, and any two parking lots meeting a predetermined condition are connected through edges.

At 102, as for any parking lot i, processing is performed in manners shown in 103-104, respectively.

At 103, local space correlation information of parking lot i at a current time is determined according to environment context features of the parking lot i and neighboring parking lots which are in the parking lot association graph and connected to the parking lot i through edges.

At 104, time correlation information of the parking lot i at the current time is determined according to the local space correlation information, and free parking space information of the parking lot i at at least one future time step is predicted according to the time correlation information of the parking lot i at the current time.

Take Beijing as an example, there might be tens of thousands of parking lots in the whole city. However, since real-time sensors are costly, they are mounted in only very few parking lots to monitor in real time the current free parking space information which usually refers to the number of free parking spaces. Hence, it is very necessary to predict free parking space information of parking lots.

In the present embodiment, the local space correlation information of the parking lots may be determined through the graph attention neural network model according to the environment context features of the parking lots, and the time correlation information of the parking lots may be determined based on the gated recurrent neural network model, to obtain an implicit vector simultaneously including the parking lot space and the time correlation, to predict the future free parking space information of the parking lots.

In real world, parking lots which are closer in geometrical space usually affect one another and generate correlation, and such correlation changes dynamically. For example, there are a residential area and an office building in a certain region, and the free parking space information of the parking lots belonging to the two normally probably show different change tendencies. However, if a concert is being held nearby, the parking spaces of the parking lots around within a range of distance are all urgently needed in this period of time. If such dynamic correlation between the parking lots can be captured, the parking lots can be predicted better.

To this end, in the present embodiment, a parking lot association graph is first built to associate possibly-relevant parking lots. That is, the parking lot association graph may be built for parking lots in a region to be processed (e.g., the city of Beijing), each junction in the parking lot association graph represents a parking lot, and any two parking lots meeting a predetermined condition are connected through edges. For example, any two parking lots with a distance less than or equal to a first predetermined threshold are connected through edges, i.e., parking lots which are close to each other have a strong correlation.

Figure 2:
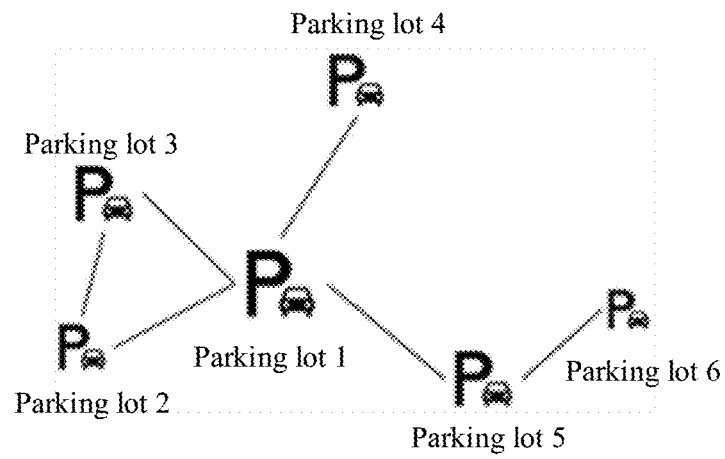
FIG. 2 illustrates a schematic diagram of a parking lot association graph according to the present disclosure.

FIG. 2 illustrates a schematic diagram of a parking lot association graph according to the present disclosure. A specific value of the first threshold may depend on actual needs, for example, 1 km, and correspondingly, there is the following formula:

$$e_{ij} = \begin{cases} 1, & dits(v_i, v_j) \leq 1km \\ 0, & \text{otherwise} \end{cases} ; \quad (1)$$

That is, if a distance dits($v_i$, $v_j$) between any two parking lots is smaller than or equal to 1 km, the two parking lots may be connected through edges, otherwise they are not connected. The distance usually refers to a road network distance.

As such, as for any parking lot ir, local space correlation information of parking lot i at a current time may be determined according to environment context features of the parking lot i and neighboring parking lots which are in the parking lot association graph and connected to the parking lot i through edges.

The environment context feature of the parking lots may include a peripheral population feature, peripheral Points of Interest (POIs) distribution feature etc. The specific content included by the environment context features may depend on actual needs. The peripheral refers to a surrounding predetermined scope. The population feature may refer to the number of active users. For example, a user will upload positioning information upon using an app such as a map app, and the user's activity regions may be obtained by using the positioning information. The POI distribution feature may include the number and types of the POIs and so on. In practical application, the obtained environment context features may be represented in the form of vectors according to predetermined rules. The environment context features are dynamically variable.

As shown in FIG. 2, parking lot i is taken as an example. Parking lot 2, parking lot 3, parking lot 4 and parking lot 5 all are neighboring parking lots of parking lot i.

As for any parking lot i, neighboring parking lots of the parking lot i may be determined first, the neighboring parking lots are parking lots which are in the parking lot association graph and connected with the parking lot i through edge, and then the local space correlation information of the parking lot i at the current time may be determined according to the environment context features of the neighboring parking lots and the parking lot i at the current time.

Specifically, as for the parking lot i, the following predetermined processing may be executed: as for neighboring parking lots, determining weights of edges between the neighboring parking lots and the parking lot i at the current time according to the environment context features of the neighboring parking lots and parking lot i at the current time, respectively; aggregating the environment context features of the neighboring parking lots according to the weights of edges between the neighboring parking lots and the parking lot i to obtain a representation vector of the parking lot i; incrementing execution times by one, the execution times being initially zero; if the execution times are equal to a second predetermined threshold, regarding the representation vector as the local space correlation information of the parking lot i at the current time, otherwise, regarding the representation vector as the environment context features of the parking lot i, and executing the predetermined processing repeatedly.

Since the environment context features of the parking lots are dynamically variable, the above weights and representation vector are also dynamically variable.

Optionally, as for any neighboring parking lot j, a weight $\alpha_{ij}$ between it and the parking lot i may be:

$$\alpha_{ij} = \frac{\exp(c_{ij})}{\sum_{k \in N_i} \exp(c_{ik})}; \quad (2)$$

where $c_{ij}$=Attention($W_\alpha x_i, W_\alpha x_j$); (3)

Attention represents a graph attention mechanism; $N_i$ represents the number of neighboring parking lots of the parking lot i; $x_i$ represents the environment context feature of the parking lot i at the current time; $x_j$ represents the environment context feature of neighboring parking lot j at the current time; $W_a$ represents a model parameter obtained by pre-training.

The environment context features of the neighboring parking lots may be aggregated according to the weights of edges between the neighboring parking lots and the parking lot i to obtain the representation vector of the parking lot i. The representation vector $x'_i$ may be:

$$x'_i = \sigma(\Sigma_{j \in N_i} \alpha_{ij} W_a x_j); \quad (4)$$

where $N_i$ represents number of neighboring parking lots of the parking lot i; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function.

Then, the set parameter, namely, the execution times, may be incremented by one, the execution times is initially zero, and whether the execution times after the increment by one are equal to the second predetermined threshold is determined. The specific value of the second threshold may depend on actual needs, for example, 2. Since the obtained execution times are 1, smaller than 2, the obtained representation vector may be taken as the environment context feature of the parking lot i. The predetermined processing is executed repeatedly, i.e., the process from Equation (2) to Equation (4) is repeated. In the present embodiment, the processing of the parking lots is performed concurrently, so while the environment context feature of the parking lot i is updated with the representation vector of the parking lot i, the environment context features of other parking lots are also updated. As such, when Equation (2)-Equation (4) are repeated, the used environment context features all are updated environment context features.

Upon completion of the repetition, the execution times become 2 equal to the second threshold, and the representation vector of the parking lot i capturing a multi-order (2-order) neighboring correlation is obtained, and the representation vector may be taken as the local space correlation information of the parking lot i at the current time.

The local space correlation information of respective parking lots at the current time may be obtained in the above processing manner.

As for any parking lot i, it is feasible to determine the time correlation information of the parking lot i at the current time according to the local space correlation information of the parking lot i at the current time, and predict the free parking space information of the parking lot i at at least one future time step according to the time correlation information of the parking lot i at the current time. As stated above, it is possible to determine the time correlation information of parking lot i at the current time based on the gated recurrent neural network model, and predict the free parking space information of the parking lot i at at least one future time step according to the time correlation information of the parking lot i at the current time. Preferably, it is possible to determine the time correlation information of the parking lot i at the current time according to the local space correlation information of the parking lot i at the current time and output of the gated recurrent neural network model at a previous time, in conjunction with the gated mechanism.

The time correlation information $h_i^t$ of the parking lot i at the current time may be:

$$h_i^t = (1 - z_i^t) \circ h_i^{t-1} + z_i^t \circ \tilde{h}_i^t; \quad (5)$$

$$\text{where } z_i^t = \sigma(W_z[h_i^{t-1}, x'_i] + b_z); \quad (6)$$

$$\tilde{h}_i^t = \tan h(W_{\tilde{h}}[r_i^t \circ h_i^{t-1}, x'_i] + b_{\tilde{h}}); \quad (7)$$

$$r_i^t = \sigma(W_r[h_i^{t-1}, x'_i] + b_r); \quad (8)$$

where $W_z$, $W_{\tilde{h}}$, $W_r$, $b_z$, $b_{\tilde{h}}$ and $b_r$ all are model parameters obtained by pre-training; $\sigma$ represents an activation function; $x'_i$ represents local space correlation information of the parking lot i at the current time; $h_i^{t-1}$ represents the output of the gated recurrent neural network model at the previous time; $\circ$ represents a matrix multiplication.

Since $x'_i$ includes the space correlation information at the current time, and $h_i^{t-1}$ includes the spatiotemporal correlation information before the time t, the obtained hl will simultaneously include time correlation information and space correlation information.

The free parking space information of the parking lot i at at least one future time step may be predicted using $h_i^t$, for example, the free parking space information of the parking lot i at future $\tau$ time steps may be predicted in the following manner:

$$(\hat{y}_i^{t+1}, \ldots, \hat{y}_i^{t+\tau}) = \sigma(W_o h_i^t); \quad (9)$$

where $\tau$ is a positive integer greater than one, and its specific value may depends on actual needs; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot at a first future time step; $\hat{y}_i^{t+\tau}$ represents the predicted free parking space information of the parking lot i at $\tau^{th}$ future time step.

Suppose the value of $\tau$ is 3, the free parking space information of the parking lot i at the first future time step, the second future time step and the third future time step, respectively according to the Equation (9).

A time step for example may be 15 minutes. In practical application, for example, as for the parking lot i, prediction is performed one time every 15 minutes in the manner stated in the present embodiment, i.e., the free parking space information of the parking lot i at three future time steps may be predicted.

In addition, when the model is trained, $N_l$ parking lots with real-time sensors may be selected as sample parking lots, annotation data may be built based on historical free parking space information of the sample parking lots, training optimization may be performed based on the annotation data, an objective function O is minimized, i.e., a MSE (Mean Square Error) between the predicted free parking space information and real free parking space information.

Wherein the objective function $$O = \frac{1}{\tau N_l} \sum_{i=1}^{N_l} \sum_{j=1}^{\tau} (\hat{y}_i^{t+j} - y_i^{t+j})^2; \quad (10)$$

where $N_l$ is a positive integer greater than 1, depending on actual needs; $y_i^{t+j}$ represents real free parking space information of any sample parking lot i at a corresponding time step.

The abovementioned model parameters may be learnt through model training. Specific implementation is of the prior art.

As appreciated, for ease of description, the aforesaid method embodiments are all described as a combination of a series of actions, but those skilled in the art should appreciated that the present disclosure is not limited to the described order of actions because some steps may be performed in other orders or simultaneously according to the present disclosure. Secondly, those skilled in the art should appreciate the embodiments described in the description all belong to preferred embodiments, and the involved actions and modules are not necessarily requisite for the present disclosure.

To sum up, according to the solution of the method embodiment of the present application, the local space correlation information and the time correlation information of the parking lot may be determined in conjunction with the environment context features of the parking lot, and future free parking space information of the parking lot may be predicted based on these information, thereby improving the accuracy of the prediction result; in addition, the local space correlation information and time correlation information of the parking lot may be obtained by virtue of different network models, thereby enhancing the accuracy of the obtained result and further enhancing the accuracy of subsequent prediction results; furthermore, when the model is trained, annotation data may be built using historical free parking space information of the parking lots with real-time sensors, and training optimization may be performed, thereby making the annotation data more accurate and improving the training effect of the model.

The above introduces the method embodiment. The solution of the present disclosure will be further described through an apparatus embodiment.

Figure 3:
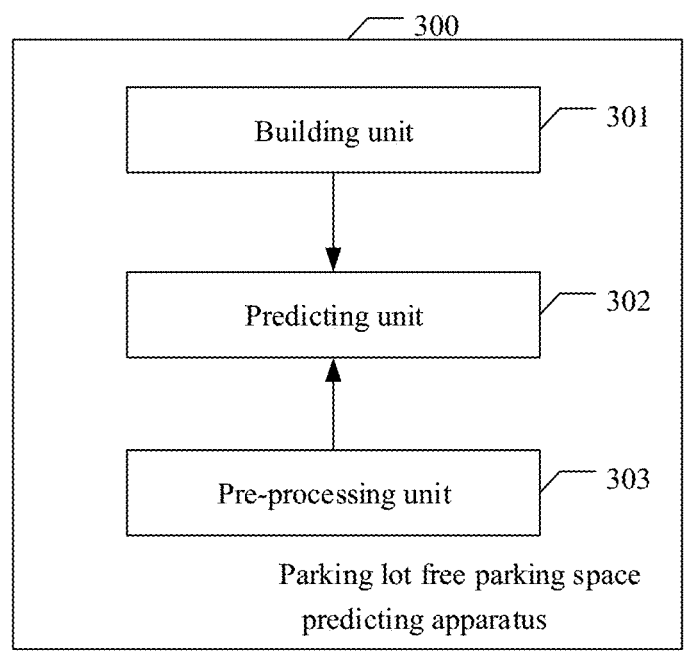
FIG. 3 illustrates a schematic structural diagram of a parking lot free parking space predicting apparatus 300 according to an embodiment of the present disclosure.

FIG. 3 illustrates a schematic structural diagram of a parking lot free parking space predicting apparatus 300 according to an embodiment of the present disclosure. As shown in FIG. 3, the apparatus comprises a building unit 301 and a predicting unit 302.

The building unit 301 is configured to build a parking lot association graph for parking lots in a region to be processed, each junction therein representing a parking lot, and connect any two parking lots meeting a predetermined condition through edges;

The predicting unit 302 is configured to, as for any parking lot i, perform the following processing respectively: determining local space correlation information of the parking lot i at a current time according to environment context features of the parking lot i and neighboring parking lots which are in the parking lot association graph and connected to the parking lot i through edges; determine time correlation information of the parking lot i at the current time according to the local space correlation information, and predict free parking space information of the parking lot i at at least one future time step according to the time correlation information of the parking lot i at the current time.

The building unit 301 may connect any two parking lots with a distance less than or equal to a first predetermined threshold through edges.

The predicting unit 302 may determine local space correlation information of parking lot i at a current time based on a graph attention neutral network model. In addition, the predicting unit 302 may determine time correlation information of the parking lot i at the current time based on a gated recurrent neural network model, and predict the free parking space information of the parking lot i at at least one future time step according to the time correlation information of the parking lot i at the current time.

Specifically, the predicting unit 302 may executes the following predetermined processing as for the parking lot i: as for neighboring parking lots, determining weights of edges between the neighboring parking lots and the parking lot i at the current time according to the environment context features of the neighboring parking lots and parking lot i at the current time, respectively; aggregating the environment context features of the neighboring parking lots according to the weights of edges between the neighboring parking lots and the parking lot i to obtain a representation vector of the parking lot i; incrementing execution times by one, the execution times being initially zero; if the execution times are equal to a second predetermined threshold, regarding the representation vector as the local space correlation information of the parking lot i at the current time, otherwise, regarding the representation vector as the environment context features of the parking lot i, and executing the predetermined processing repeatedly.

A weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})}; \quad (2)$$

where $c_{ij}$=Attention$(W_a x_i, W_a x_j)$; (3)

Attention represents a graph attention mechanism; $N_i$ represents the number of neighboring parking lots of the parking lot i; $x_i$ represents the environment context feature of the parking lot i at the current time; $x_j$ represents the environment context feature of neighboring parking lot j at the current time; $W_a$ represents a model parameter obtained by pre-training.

The representation vector $$x'_i = \sigma(\Sigma_{j \in N_i} \alpha_{ij} W_a x_j); \quad (4)$$

where $N_i$ represents number of neighboring parking lots of the parking lot i; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; σ represents an activation function.

The predicting unit 302 may further determine the time correlation information of parking lot i at the current time according to the local space correlation information of the parking lot i at the current time and output of the gated recurrent neural network model at a previous time.

The time correlation information hl of the parking lot i at the current time may be:

$$h_i^t = (1-z_i^t) \circ h_i^{t-1} + z_i^t \circ \tilde{h}_i^t; \quad (5)$$

where $z_i^t = \sigma(W_z[h_i^{t-1}, x'_i] + b_z)$; (6)

$$\tilde{h}_i^t = \tan h(W_{\tilde{h}}[r_i^t \circ h_i^{t-1}, x'_i] + b_{\tilde{h}}); \quad (7)$$

$$r_i^t = \sigma(W_r[h_i^{t-1}, x'_i] + b_r); \quad (8)$$

where $W_z$, $W_{\tilde{h}}$, $W_r$, $b_z$, $b_{\tilde{h}}$ and $b_r$ all are model parameters obtained by pre-training; σ represents an activation function; $x'_i$ represents local space correlation information of the parking lot i at the current time; $h_i^{t-1}$ represents the output of the gated recurrent neural network model at the previous time; ∘ represents a matrix multiplication.

The predicting unit 302 may predict the free parking space information of the parking lot i at at least one future time step by using hl, for example, predict the free parking space information of the parking lot i at future τ time steps in the following manner:

$$(\hat{y}_i^{t+1}, \ldots, \hat{y}_i^{t+\tau}) = \sigma(W_o h_i^t); \quad (9)$$

where τ is a positive integer greater than one, depending on actual needs; $h_i^t$ represents the time correlation information of the parking lot i at the current time; $W_o$ represents a model parameter obtained by pre-training, σ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

The apparatus shown in FIG. 3 may further comprise: a pre-processing unit 303 configured to perform model training, wherein $N_l$ parking lots with real-time sensors are selected as sample parking lots, annotation data are built based on historical free parking space information of the sample parking lots, training optimization is performed based on the annotation data, and an objective function O is minimized.

The objective function $$O = \frac{1}{\tau N_l} \sum_{i=1}^{N_l} \sum_{j=1}^{\tau} (\hat{y}_i^{t+j} - y_i^{t+j})^2; \quad (10)$$

where $N_l$ is a positive integer greater than 1, depending on actual needs; $y_i^{t+j}$ represents real free parking space information of any sample parking lot i at a corresponding time step.

A specific workflow of the apparatus embodiment shown in FIG. 3 will not be detailed any more here, and reference may be made to corresponding depictions in the above method embodiment.

To sum up, according to the solution of the apparatus embodiment of the present application, the local space correlation information and the time correlation information of the parking lot may be determined in conjunction with the environment context features of the parking lot, and future free parking space information of the parking lot may be predicted based on these information, thereby improving the accuracy of the prediction result; in addition, the local space correlation information and time correlation information of the parking lot may be obtained by virtue of different network models, thereby enhancing the accuracy of the obtained result and further enhancing the accuracy of subsequent prediction results; furthermore, when the model is trained, annotation data may be built using historical free parking space information of the parking lots with real-time sensors, and training optimization may be performed, thereby making the annotation data more accurate and improving the training effect of the model.

According to embodiments of the present disclosure, the present disclosure further provides an electronic device and a readable storage medium.

Figure 4:
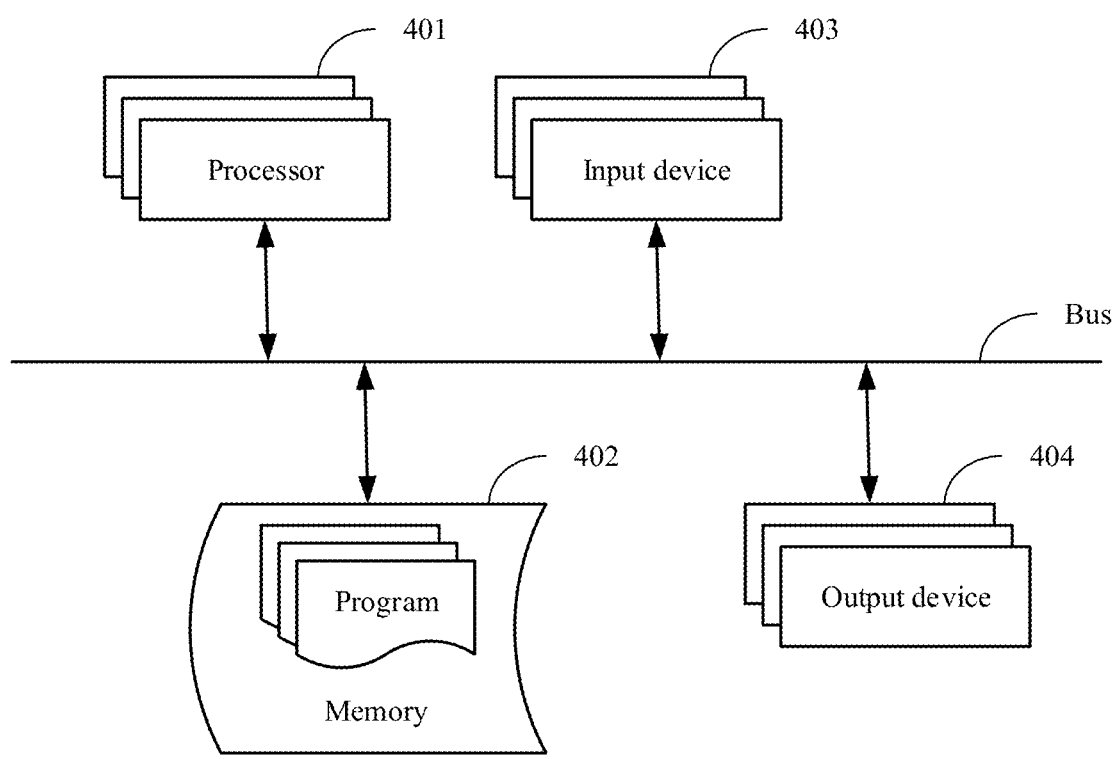
FIG. 4 illustrates a block diagram of an electronic device for implementing the method according to embodiments of the present disclosure.

As shown in FIG. 4, it shows a block diagram of an electronic device for the method according to embodiments of the present disclosure. The electronic device is intended to represent various forms of digital computers, such as laptops, desktops, workstations, personal digital assistants, servers, blade servers, mainframes, and other appropriate computers. The electronic device is further intended to represent various forms of mobile devices, such as personal digital assistants, cellular telephones, smartphones, wearable devices and other similar computing devices. The components shown here, their connections and relationships, and their functions, are meant to be exemplary only, and are not meant to limit implementations of the inventions described and/or claimed in the text here.

As shown in FIG. 4, the electronic device comprises: one or more processors 401, a memory 402, and interfaces connected to components and including a high-speed interface and a low speed interface. Each of the components are interconnected using various busses, and may be mounted on a common motherboard or in other manners as appropriate. The processor can process instructions for execution within the electronic device, including instructions stored in the memory or on the storage device to display graphical information for a GUI on an external input/output device, such as a display device coupled to the interface. In other implementations, multiple processors and/or multiple buses may be used, as appropriate, along with multiple memories and types of memory. Also, multiple electronic devices may be connected, with each device providing portions of the necessary operations (e.g., as a server bank, a group of blade servers, or a multi-processor system). One processor Y01 is taken as an example in FIG. 4.

The memory 402 is a non-transitory computer-readable storage medium provided by the present disclosure. Wherein, the memory stores instructions executable by at least one processor, so that the at least one processor executes the method provided by the present disclosure. The non-transitory computer-readable storage medium of the present disclosure stores computer instructions, which are used to cause a computer to execute the method according to the present disclosure.

The memory 402 is a non-transitory computer-readable storage medium and can be used to store non-transitory software programs, non-transitory computer executable programs and modules, such as program instructions/modules corresponding to the method in embodiments of the present disclosure. The processor Y01 executes various functional applications and data processing of the server, i.e., implements the method in the above method embodiment, by running the non-transitory software programs, instructions and units stored in the memory 402.

The memory 402 may include a storage program region and a storage data region, wherein the storage program region may store an operating system and an application program needed by at least one function; the storage data region may store data created according to the use of the electronic device for implementing the video blending method according to the embodiment of the present disclosure. In addition, the memory 402 may include a high-speed random access memory, and may also include a non-transitory memory, such as at least one magnetic disk storage device, a flash memory device, or other non-transitory solid-state storage device. In some embodiments, the memory 402 may optionally include a memory remotely arranged relative to the processor 401, and these remote memories may be connected to the electronic device for implementing the video blending method according to embodiments of the present disclosure through a network. Examples of the above network include, but are not limited to, the Internet, an intranet, a local area network, a mobile communication network, and combinations thereof.

The electronic device for implementing the video blending method may further include an input device 403 and an output device 404. The processor 401, the memory 402, the input device 403 and the output device 404 may be connected through a bus or in other manners. In FIG. 4, the connection through the bus is taken as an example.

The input device 403 may receive inputted numeric or character information and generate key signal inputs related to user settings and function control of the electronic device for implementing the video blending method according to the embodiment of the present disclosure, and may be an input device such as a touch screen, keypad, mouse, trackpad, touchpad, pointing stick, one or more mouse buttons, trackball and joystick. The output device 404 may include a display device, an auxiliary lighting device (e.g., an LED), a haptic feedback device (for example, a vibration motor), etc. The display device may include but not limited to a Liquid Crystal Display (LCD), a Light Emitting Diode (LED) display, and a plasma display. In some embodiments, the display device may be a touch screen.

Various implementations of the systems and techniques described here may be realized in digital electronic circuitry, integrated circuitry, specially designed ASICs (Application Specific Integrated Circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to send data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" and "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

It should be understood that the various forms of processes shown above can be used to reorder, add, or delete steps. For example, the steps described in the present disclosure can be performed in parallel, sequentially, or in different orders as long as the desired results of the technical solutions disclosed in the present disclosure can be achieved, which is not limited herein.

The foregoing specific implementations do not constitute a limitation on the protection scope of the present disclosure. It should be understood by those skilled in the art that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A computer-implemented parking lot free parking space predicting method, comprising:
building a parking lot association graph for parking lots in a region to be processed, each junction therein representing a parking lot, and connecting any two parking lots meeting a predetermined condition through edges;
aggregating, by at least one processor, environment context features of neighboring parking lots according to weights of edges between the neighboring parking lots and a parking lot i to obtain a representation vector of the parking lot i at a current time;
pre-training, by the at least one processor, a graph attention neural network model using the environment context features of the neighboring parking lots and free parking space information;
pre-training, by the at least one processor, a gated recurrent neural network model according to the representation vector of the parking lot i at the current time;
for a parking lot i, performing the following processing respectively:
determining, by the at least one processor, local space correlation information of the parking lot i at a current time based on the graph attention neural network model according to environment context features of the parking lot i and neighboring parking lots which are in the parking lot association graph and connected to the parking lot i through edges;
determining, by the at least one processor, time correlation information of the parking lot i at the current time based on the gated recurrent neural network model according to the local space correlation information; and
predicting, by the at least one processor, free parking space information of the parking lot i at at least one future time step according to the time correlation information of the parking lot i at the current time;
wherein the determining local space correlation information of parking lot i at a current time based on a graph attention neural network model comprises:

for the parking lot i, executing the following predetermined processing:

for each neighboring parking lot, determining a weight of edge between the neighboring parking lot and the parking lot i at the current time according to the environment context features of the neighboring parking lots and parking lot i at the current time, respectively;

incrementing execution times by one, the execution times being initially zero;

if the execution times are equal to a second predetermined threshold, selecting the representation vector as the local space correlation information of the parking lot i at the current time, otherwise, selecting the representation vector as the environment context features of the parking lot i, and executing the predetermined processing repeatedly, wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i$, $W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or the representation vector $x'_i = \sigma(\Sigma_{j \in N} \alpha_{ij} W_a x_j)$, where $N_i$ represents a number of the neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function, and wherein the method further enhancing the accuracy of subsequent prediction results comprises:

training the graph attention neural network model and the gated recurrent neural network model by selecting $N_l$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_l} \sum_{i=1}^{N_l} \sum_{j=1}^{\tau} (\hat{y}_i^{t+j} - y_i^{t+j})^2,$$

where $N_l$ is a positive integer greater than 1; $y_i^{t+j}$ represents real free parking space information of any sample parking lot i at a corresponding time step.

2. The method according to claim 1, wherein the connecting any two parking lots meeting a predetermined condition through edges comprises: connecting any two parking lots with a distance less than or equal to a first predetermined threshold through edges.

3. The method according to claim 1, wherein the determining time correlation information of the parking lot i at the current time based on a gated recurrent neural network model comprises:

determining the time correlation information of parking lot i at the current time according to the local space correlation information of the parking lot i at the current time and output of the gated recurrent neural network model at a previous time.

4. The method according to claim 3, wherein the time correlation information $h_i^t$ of the parking lot i at the current time is expressed as $h_i^t = (1-z_i^t) \circ h_i^{t-1} + z_i^t \circ \tilde{h}_i^t;$ where $z_i^t = \sigma(W_z[h_i^{t-1}, x'_i] + b_z);$ $\tilde{h}_i^t = \tan h(W_{\tilde{h}}[r_i^t \circ h_i^{t-1}, x'_i] + b_{\tilde{h}});$ $r_i^t = \sigma(W_r[h_i^{t-1}, x'_i] + b_r);$ where $W_z$, $W_{\tilde{h}}$, $W_r$, $b_z$, $b_{\tilde{h}}$ and $b_r$ all are model parameters obtained by pre-training; $\sigma$ represents an activation function; $x'_i$ represents local space correlation information of the parking lot i at the current time; $h_i^{t-1}$ represents the output of the gated recurrent neural network model at the previous time; and $\circ$ represents a matrix multiplication.

5. The method according to claim 1, wherein the predicting free parking space information of the parking lot i at at least one future time step according to the time correlation information of the parking lot i at the current time comprises:

predicting the free parking space information of the parking lot i at future $\tau$ time steps in the following manner: $(\hat{y}_i^{t+1}, \ldots, \hat{y}_i^{t+\tau}) = \sigma(W_o h_i^t);$ where $\tau$ is a positive integer greater than one; $h_i^t$ represents the time correlation information of the parking lot i at the current time; $W_o$ represents a model parameter obtained by pre-training, $\sigma$ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

6. An electronic device, comprising
at least one processor; and
a memory communicatively connected with the at least one processor;

wherein the memory stores instructions executable by the at least one processor, and the instructions are executed by the at least one processor to enable the at least one processor to perform a parking lot free parking space predicting method, wherein the method comprises:

building a parking lot association graph for parking lots in a region to be processed, each junction therein representing a parking lot, and connecting any two parking lots meeting a predetermined condition through edges;

aggregating environment context features of neighboring parking lots according to weights of edges between the neighboring parking lots and a parking lot i to obtain a representation vector of the parking lot i at a current time;

pre-training a graph attention neural network model using the environment context features of the neighboring parking lots and free parking space information;

pre-training a gated recurrent neural network model according to the representation vector of the parking lot i at the current time;

for a parking lot i, performing the following processing respectively:

determining local space correlation information of the parking lot i at a current time based on the graph attention neural network model according to environment context features of the parking lot i and neighboring parking lots which are in the parking lot association graph and connected to the parking lot i through edges;

determining time correlation information of the parking lot i at the current time based on the gated recurrent neural network model according to the local space correlation information; and predicting free parking space information of the parking lot i at at least one future time step according to the time correlation information of the parking lot i at the current time;

wherein the determining local space correlation information of parking lot i at a current time based on a graph attention neural network model comprises:

for the parking lot i, executing the following predetermined processing:

for each neighboring parking lot, determining a weight of edge between the neighboring parking lot and the parking lot i at the current time according to the environment context features of the neighboring parking lots and parking lot i at the current time, respectively;

incrementing execution times by one, the execution times being initially zero;

if the execution times are equal to a second predetermined threshold, selecting the representation vector as the local space correlation information of the parking lot i at the current time, otherwise, selecting the representation vector as the environment context features of the parking lot i, and executing the predetermined processing repeatedly, wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i$, $W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or the representation vector $x'_i = \sigma(\Sigma_{j \in N_i} \alpha_{ij} W_a x_j)$;

where $N_i$ represents a number of the neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; σ represents an activation function, and wherein the method further enhancing the accuracy of subsequent prediction results comprises:

training the graph attention neural network model and the gated recurrent neural network model by selecting $N_l$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_l} \sum_{i=1}^{N_l} \sum_{j=1}^{\tau} (\hat{y}_i^{t+j} - y_i^{t+j})^2,$$

where $N_l$ is a positive integer greater than 1; $y_i^{t+j}$ represents real free parking space information of any sample parking lot i at a corresponding time step.

7. The electronic device according to claim 6, wherein the connecting any two parking lots meeting a predetermined condition through edges comprises: connecting any two parking lots with a distance less than or equal to a first predetermined threshold through edges.

8. The electronic device according to claim 6, wherein the determining time correlation information of the parking lot i at the current time based on a gated recurrent neural network model comprises:

determining the time correlation information of parking lot i at the current time according to the local space correlation information of the parking lot i at the current time and output of the gated recurrent neural network model at a previous time.

9. The electronic device according to claim 8, wherein the time correlation information $h_i^t$ of the parking lot i at the current time is expressed as $h_i^t = (1 - z_i^t) \circ h_i^{t-1} + z_i^t \circ \tilde{h}_i^t$;

where $z_i^t = \sigma(W_z[h_i^{t-1}, x'_i] + b_z)$;

$\tilde{h}_i^t = \tan h(W_{\tilde{h}}[r_i^t \circ h_i^{t-1}, x'_i] + b_{\tilde{h}})$;

$r_i^t = \sigma(W_r[h_i^{t-1}, x'_i] + b_r)$;

where $W_z$, $W_{\tilde{h}}$, $W_r$, $b_z$, $b_{\tilde{h}}$ and $b_r$ all are model parameters obtained by pre-training; σ represents an activation function; $x'_i$ represents local space correlation information of the parking lot i at the current time; $h_i^{t-1}$ represents the output of the gated recurrent neural network model at the previous time; and ∘ represents a matrix multiplication.

10. The electronic device according to claim 6, wherein the predicting free parking space information of the parking lot i at at least one future time step according to the time correlation information of the parking lot i at the current time comprises:

predicting the free parking space information of the parking lot i at future τ time steps in the following manner: $(\hat{y}_i^{t+1}, \ldots, \hat{y}_i^{t+\tau}) = \sigma(W_o h_i^t)$;

where τ is a positive integer greater than one; $h_i^t$ represents the time correlation information of the parking lot i at the current time; $W_o$ represents a model parameter obtained by pre-training, σ represents an activation function; $\hat{y}_i^{t+1}$ represents the predicted free parking space information of the parking lot i at a first future time step; $\hat{y}_i^{t+\tau}$ represents the predicted free parking space information of the parking lot i at $\tau^{th}$ future time step.

11. A non-transitory computer-readable storage medium storing computer instructions therein, wherein the computer instructions are used to cause the computer to perform a parking lot free parking space predicting method, wherein the method comprises:

building a parking lot association graph for parking lots in a region to be processed, each junction therein representing a parking lot, and connecting any two parking lots meeting a predetermined condition through edges;

aggregating environment context features of neighboring parking lots according to weights of edges between the neighboring parking lots and a parking lot i to obtain a representation vector of the parking lot i at a current time;

pre-training a graph attention neural network model using the environment context features of the neighboring parking lots and free parking space information;

pre-training a gated recurrent neural network model according to the representation vector of the parking lot i at the current time;

for a parking lot i, performing the following processing respectively:

determining local space correlation information of the parking lot i at a current time based on the graph attention neural network model according to environment context features of the parking lot i and neighboring parking lots which are in the parking lot association graph and connected to the parking lot i through edges;

determining time correlation information of the parking lot i at the current time based on the gated recurrent neural network model according to the local space correlation information; and predicting free parking space information of the parking lot i at at least one future time step according to the time correlation information of the parking lot i at the current time, wherein the determining local space correlation information of parking lot i at a current time based on a graph attention neural network model comprises:

for the parking lot i, executing the following predetermined processing:

for each neighboring parking lot, determining a weight of edge between the neighboring parking lots and the parking lot i at the current time according to the environment context features of the neighboring parking lots and parking lot i at the current time, respectively;

incrementing execution times by one, the execution times being initially zero;

if the execution times are equal to a second predetermined threshold, selecting the representation vector as the local space correlation information of the parking lot i at the current time, otherwise, selecting the representation vector as the environment context features of the parking lot i, and executing the predetermined processing repeatedly, wherein a weight $\alpha_{ij}$ of the edge between any neighboring parking lot j and parking lot i is expressed as $$\alpha_{ij} = \frac{\exp(c_{ij})}{\sum_{k \in N_i} \exp(c_{ik})};$$

where $c_{ij}$=Attention($W_a x_i$, $W_a x_j$); Attention represents a graph attention mechanism; $N_i$ represents the number of neighboring parking lots; $x_i$ represents the environment context feature of the parking lot i at the current time; $x_j$ represents the environment context feature of neighboring parking lot j at the current time; $W_a$ represents a model parameter obtained by pre-training, or the representation vector $x'_i = \sigma(\Sigma_{j \in N_i} \alpha_{ij} W_a x_j)$;

where $N_i$ represents a number of the neighboring parking lots; $x_j$ represents the environment context feature of any neighboring parking lot j among $N_i$ neighboring parking lots at the current time; $\alpha_{ij}$ represents a weight of the edge between the neighboring parking lot j and parking lot i at the current time; $W_a$ represents a model parameter obtained by pre-training; $\sigma$ represents an activation function, and wherein the method further enhancing the accuracy of subsequent prediction results comprises:

training the graph attention neural network model and the gated recurrent neural network model by selecting $N_l$ parking lots with real-time sensors as sample parking lots, building annotation data based on historical free parking space information of the sample parking lots, performing training optimization based on the annotation data, and minimizing an objective function O;

where the objective function $$O = \frac{1}{\tau N_l} \sum_{i=1}^{N_l} \sum_{j=1}^{\tau} (\hat{y}_i^{t+j} - y_i^{t+j})^2,$$

$N_l$ is a positive integer greater than 1; $y_i^{t+j}$ represents real free parking space information of any sample parking lot i at a corresponding time step.

* * * * *